United States Patent
Kahl et al.

(10) Patent No.: US 11,463,501 B2
(45) Date of Patent: Oct. 4, 2022

(54) METHOD OF DETERMINING THE SPEECH IN A WEB-RTC AUDIO OR VIDEO COMMUNICATION AND/OR COLLABORATION SESSION AND COMMUNICATION SYSTEM

(71) Applicant: Unify Patente GmbH & Co. KG, Munich (DE)

(72) Inventors: Klaus Kahl, Kerpen (DE); Frank Reif, Aachen (DE)

(73) Assignee: Unify Patente GmbH & Co. KG, Munich (DE)

( * ) Notice: Subject to any disclaimer, the term of this patent is extended or adjusted under 35 U.S.C. 154(b) by 0 days.

(21) Appl. No.: 17/090,956

(22) Filed: Nov. 6, 2020

(65) Prior Publication Data
US 2021/0144191 A1    May 13, 2021

(30) Foreign Application Priority Data
Nov. 11, 2019  (EP) .................................. 19 208 374

(51) Int. Cl.
*G06F 15/16*    (2006.01)
*H04L 65/80*    (2022.01)
(Continued)

(52) U.S. Cl.
CPC ............. *H04L 65/80* (2013.01); *G10L 15/26* (2013.01); *G10L 25/57* (2013.01); *G10L 25/60* (2013.01)

(58) Field of Classification Search
CPC ......... H04L 65/80; G10L 15/26; G10L 25/57; G10L 25/60
See application file for complete search history.

(56) References Cited

U.S. PATENT DOCUMENTS 6,275,797 B1    8/2001 Randic
9,183,834 B2 *  11/2015 Gatzke .................... G10L 15/26
(Continued)

OTHER PUBLICATIONS

"Speech Transcription Server Automated Speech-to-Text Conversation Application", GL Communications Inc., Nov. 23, 2018, XPO55685444, Retrieved from Internet: URL: https://web.archive.org/web/20181123014427/https://www.gl.com.speech-to-text-conversion-utility.html [retrieved on Apr. 14, 2020].
(Continued)

*Primary Examiner* — Oleg Survillo
(74) *Attorney, Agent, or Firm* — Buchanan Ingersoll & Rooney PC

(57) ABSTRACT

An apparatus and method for determining the speech quality in a Web-RTC audio and/or video communication session. can include receiving an audio data stream comprising speech data transmitted from a second client used by a second participant of the session, transmitting at the at least one first client, the speech data to a transcriber to transcribe the speech data into text data and estimate or otherwise determine a confidence value for the transcribed text data to indicate a probability on the correctness of the word recognition from the speech data. The determined confidence value can be transmitted is from the at least one first client to the second client so the confidence value can be displayed to the speaking second participant via a display device of the client of that user so the user can evaluate his or her speech quality and take corrective action without interruption if needed.

16 Claims, 2 Drawing Sheets

(51) Int. Cl.
*G10L 15/26* (2006.01)
*G10L 25/57* (2013.01)
*G10L 25/60* (2013.01)

(56) References Cited

U.S. PATENT DOCUMENTS

| | | | |
|---|---|---|---|
| 9,876,901 B1* | 1/2018 | Bazzica | G10L 15/26 |
| 2018/0144747 A1* | 5/2018 | Skarbovsky | G06F 40/109 |
| 2019/0312973 A1* | 10/2019 | Engelke | H04M 1/72433 |

OTHER PUBLICATIONS

Wenyu Jiang et al.: "Speech Recognition Performance as an Effective Perceived Quality Predictor", IEEE 2002 Tenth EEE International Workshop on Quality of Service (Cat. No. 02EX564) IEEE Piscataway, NJ, USA, IEEE, No. 10th, Jan. 1, 2002, pp. 269-275, XP002594253.

European Search Report for European Patent Application No. 19208374.9 dated Apr. 29, 2020.

\* cited by examiner

METHOD OF DETERMINING THE SPEECH IN A WEB-RTC AUDIO OR VIDEO COMMUNICATION AND/OR COLLABORATION SESSION AND COMMUNICATION SYSTEM

CROSS-REFERENCE TO RELATED APPLICATIONS

The present application claims priority to European Patent Application No. 19 208 374.9, which was filed on Nov. 11, 2019. The entirety of this patent application is incorporated by reference herein.

FIELD

The present invention relates to a method of determining the speech in a Web-RTC audio or video communication and/or collaboration session and to a corresponding communication system and apparatus.

BACKGROUND

Web Real-Time Communication (also referred to herein as "WebRTC" or "Web-RTC") based conferences nowadays are widely used for communication and collaboration when a plurality of users are located remotely. However, in such audio or video conferences, the audio or speech quality often is impaired, for example, due to bad data transmission within the communication network, inconvenient positioning of the microphone, background or ambient noise, bad speech of the user the speech of whom is transmitted to the other users or participants of the conference, as mumbling or whispering, noises of the user the speech of whom is transmitted to the other users or participants of the conference, as loud breathing or puffing, and the like. Usually, in order to signal to the user, the speech of whom is transmitted to the other conference participants, that his or her speech quality is poor or impaired, the only means is that another participant interrupts him or her so as to inform him on her about this problem.

SUMMARY

We have determined that such an interruption of the speaker or speaking user/participant is inefficient. A small problem concerning the speech may cause a long interruption of the ongoing conference session. Also, other participants may feel uncomfortable when having to interrupt another speaker while the latter is talking. However, if none of the other participants becomes active, as outlined above, then the poor speech quality of the speaker will remain like this, as he or she is unaware of the problem.

We determined that systems or tools for detecting the audio quality during an ongoing WebRTC audio or video communication and/or collaboration session known from prior art, as for example, the speech transmission index or the mean opinion score (MOS), are rather complex to implement or are not reliable enough as usually, according to prior art, a predetermined artificial test signal is used to determine speech quality. However, such an artificial test signal will typically not comprise certain disturbing or interference sources, as for example, an incorrect location of the microphone or mumbling of the speaker.

Therefore, we developed embodiments of a method of determining the speech quality in a Web-RTC audio or video communication and/or collaboration session and a corresponding communication system and corresponding communication apparatus (e.g. server, communication terminal, communication system, etc.) which can at least partially (if not completely) mitigate the above mentioned problems.

For example, a method of determining the speech quality in a Web-RTC audio or video communication and/or collaboration session is provided, wherein the method comprises the steps of receiving, at a first client used by a first participant of the audio or video communication and/or collaboration session, an audio data stream comprising speech data transmitted from a second client used by a second participant of the audio or video communication and/or collaboration session, transmitting, at the first client, the speech data to a transcriber, where the speech data is transcribed into text data, and where a confidence value for the transcribed text data is calculated, the confidence value indicating a probability on the correctness of the word recognition from the speech data, and transmitting the confidence value from the first client to the second client so as to display the confidence value as a measure for the speech quality.

In some embodiments, the speech quality can be determined based on natural spoken language, namely, exactly on the basis of a speaker's speech. Thereby, the thus measured speech quality can correspond to the actual audibility on the listener's side excellently. Namely, in contrast to prior art solutions which generally use an artificial test signal for determining the audio quality of a transmission channel, according to the present invention, also those cases are covered concerning the actual situation during the conference or communication session, for example, as the speaker does not wear his microphone correctly or if he or she is mumbling while speaking. That is, the comprehensibility of the transmitted speech at the other end is calculated.

Also, since the result from testing the speech quality is automatically transmitted to the speaker in a communication and collaboration session, no other participants have to intervene. The speaker will not be interrupted, but rather he or she will receive the value indicating the speech quality continuously during his or her ongoing talk, so as to be able to immediately take corresponding adequate measures to eliminate the problem and thus, improve the speech quality.

According to a preferred embodiment of the invention, the confidence value is a value in the range of 0 to 1 or 0% to 100%, and wherein a high confidence value (e.g. 1 or 100%) indicates a good speech quality and a low confidence value (e.g. 0 or 0%) indicates an impaired or poor speech quality. This is a very easy and reliable measure for determining the actual and personal speech quality of a specific person in any situation during the communication and collaboration session.

According to another preferred embodiment of the invention, the transcriber can include a voice recognition engine. Embodiments of the transcriber can be configured to transcribe audio data (e.g. speech data of at least one user within the audio data stream transmittable by a client or transmitted by the client) to text and to analyze or evaluate the transcribed text according to a confidence value.

According to still another preferred embodiment of the invention, the user of the second client is a speaker in the WebRTC audio and/or video communication and collaboration session.

Preferably, the confidence value is visually displayed, at a display means (e.g. a display, a liquid crystal display, a monitor, another type of display device, etc.) of the second client.

Also, it can be advantageous, if the confidence value is determined at all clients participating in the WebRTC audio or video communication and/or collaborations session based on the transcription of the speech data obtained from the audio stream transmitted from the second client.

Alternatively, for all confidence values determined at all clients, a mean value (e.g. an average value) can be calculated, which can be transmitted to the second client and displayed at the display means of the second client as a measure for the speech quality individually for every client or transmission path to that client. A user interface can be generated on the client's display or a display connected to the client to provide a display of this information (e.g. display the determined mean value as a number or percentage, as a chart providing a record of past through current values, a color coded number or chart using different colors to represent quality levels within particular pre-selected quality ranges (e.g. "bad" being a lowest range of 0-0.1, "below average" being a range of between 0.1 and 0.3, average being a range of "0.3-0.7, above average being a range of 0.7-0.9, and excellent being a range of 0.9-1.0, etc.)

According to anther preferred embodiment of the invention, all confidence values determined at all clients are transmitted to the second client and displayed at the display means of the second client as a measure for the speech quality.

Further, the determination of the confidence value for the transcribed audio data may be carried out continuously during the WebRTC communication and collaboration session. Thus, as the speech quality is monitored in real-time and continuously during a communication and collaboration session, the method is superior compared to methods and systems or tools known from prior art, which currently are not able to determine speech quality in real-time and continuously.

Preferably, the WebRTC communication and collaboration session is an audio or a video conference.

It is also preferable, if the audio stream comprising the speech data is tested on the basis of the confidence value at at least one further location on the transmission path from the second client to the first client. Advantageously, the at least one further location on the transmission path from the second client to the first client can include additional testing of the speech data at the conference server. This embodiment can enable a more distinguished approach so as to possibly find a source of degrading audio quality which does not arise from the speaker and his speech himself or herself, as also the signal transmitted is tested at several points or locations in the communication path. For example, according to yet another preferred embodiment of the invention, the audio stream comprising the speech data is tested on the basis of the confidence value in the communication path from the second client to the conference server when entering the conference server, and on a further communication path when leaving the conference server.

Moreover, according to the present invention, a communication system for performing an WebRTC-based audio or video communication and/or collaboration session is provided. The communication system can include a conference server and a plurality of clients communicating with each other via a communication network, wherein each of the clients comprises or is connectable to a transcriber (e.g. a voice recognition engine, a speech recognition engine configured to recognize speech and evaluate the quality of the speech data, etc.) for determining the speech quality according to the method as described above.

Preferably, the server also comprises at least one transcriber for determining the speech quality according to the method as described above.

It should be appreciated that the server and clients include communication devices. For instance, the server can be configured to include a processor connected to non-transitory memory and at least one transceiver that is connectable to the network for communicative connection of the server to the clients via at least one network connection (e.g. a large area network connection, the internet, etc.). The non-transitory computer readable medium can be flash memory, solid state memory, a hard drive, or other type of memory that is connectable to the processor so that the processor can run one or more applications stored on the memory. An application can include code that defines an embodiment of a method to be performed by the server when the processor runs the application.

As another example, each client can include a communication terminal or other type of device that includes a processor connected to non-transitory memory and at least one transceiver that is connectable to the network for communicative connection of the client to the server and the client to other clients via at least one network connection (e.g. a large area network connection, the internet, etc.). The non-transitory computer readable medium can be flash memory, solid state memory, a hard drive, or other type of memory that is connectable to the processor so that the processor can run one or more applications stored on the memory. An application can include code that defines an embodiment of a method to be performed by the server when the processor runs the application. Each communication terminal and the conference server can include or be connectable to at least one input device, at least one output device, or at least one input/output device (e.g. a keypad, a touch screen, a pointer device, buttons, etc.).

Other details, objects, and advantages of the telecommunications apparatus, system, device, non-transitory computer readable medium, and method will become apparent as the following description of certain exemplary embodiments thereof proceeds.

BRIEF DESCRIPTION OF THE DRAWINGS

The invention and embodiments thereof will be described below in further detail in connection with the drawings. It should be understood that like reference characters used in the drawings may identify like components.

Figure 1:
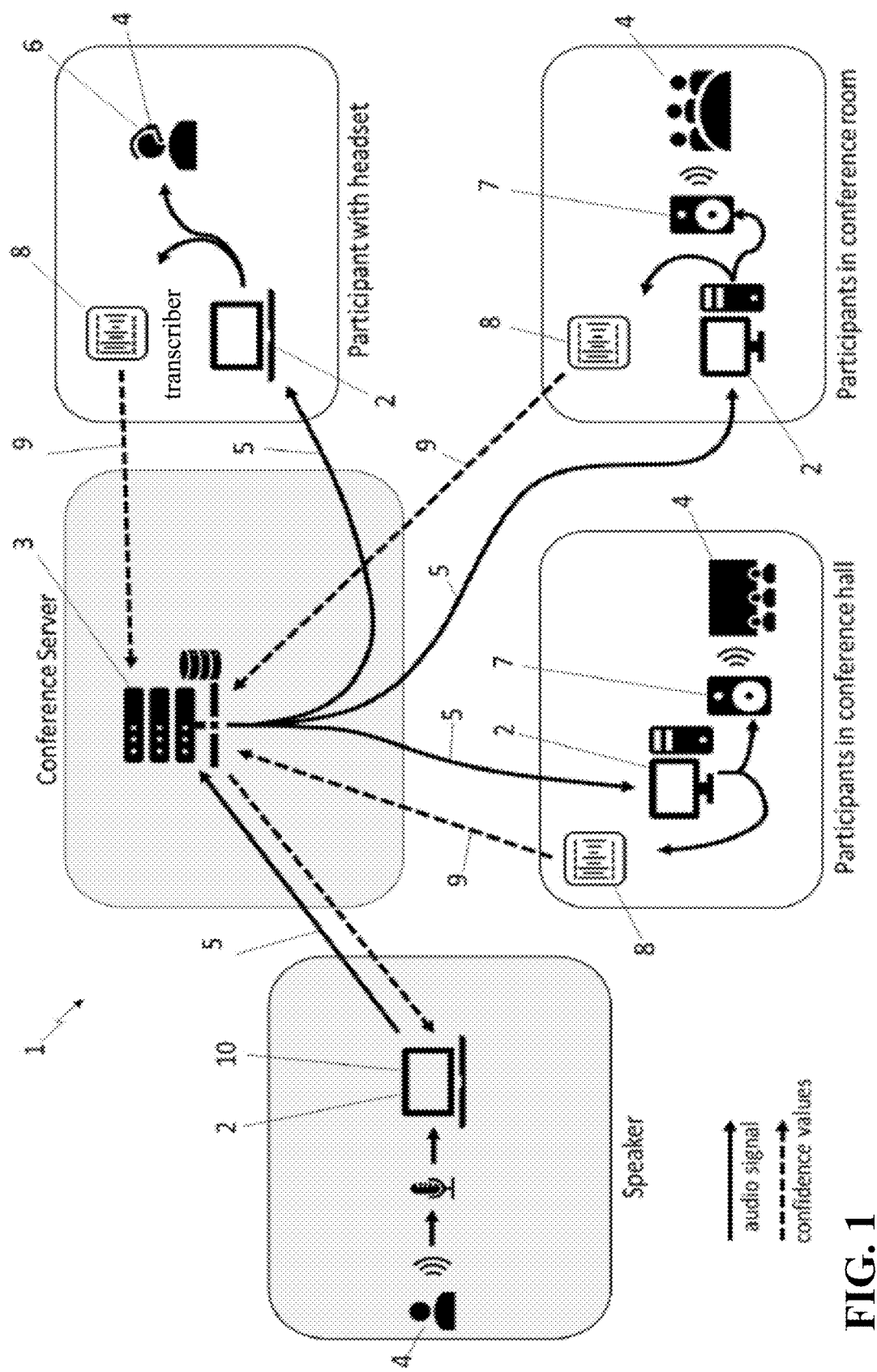
FIG. 1 schematically shows a communication system according to an embodiment of the invention.

Reference numerals utilized in the drawings include:

| | |
|---|---|
| 1 | Communication system |
| 2, 2', 2'', 2''' | Clients |
| 3 | Server |
| 4, 4', 4'', 4''' | Users |
| 5, 5', 5'', 5''' | Communication Paths |
| 6 | Headset |
| 7, 7' | Loudspeaker |
| 8', 8'', 8''', 8'''' 8''''' | Transcriber |

| | |
|---|---|
| 9', 9", 9''' | Transmission Paths |
| 10 | Display Device |

DETAILED DESCRIPTION OF EXEMPLARY EMBODIMENTS

FIG. 1 schematically shows a communication system 1 for carrying out a WebRTC-based audio or video communication and collaboration session in which a plurality of users or participants communicate with each other via a communication network with a plurality of clients 2, 2',2", 2''' and a central media or conference server 3. For example, the communication and collaboration session may be a video or audio conference, in which a user or participant 4 using a client 2 is a speaker giving a talk or the like to the other users or participants 4',4", 4''' respectively using the clients 2', 2", 2'''. The user's speech can be recorded by a microphone connected to the user's client so the input of the speech can then be received by the client for transmission within an audio data stream. In some embodiments, the microphone can be a separate unit or be incorporated into a headset 6. The audio data can also be output at each user's client via at least one speaker (e.g. a loudspeaker 7, ear buds or headphones that can be incorporated into a headset 6 or that may be a separate audio output device that may be connected to the client, etc.).

In the example of FIG. 1, the user 4' can be an individual remotely located participant using a headset 6 to listen to the speaker's talk or speech. The user 4" is a group of users located in a conference room, whereas the user 4''' is another group of users located in a conference hall. Both rooms, the conference room and the conference hall are equipped with respective audio output devices (e.g. loudspeakers 7, 7'). Also, every client of the listening users 4', 4", 4''' is equipped with a transcriber 8', 8", 8''' that is configured so as to transcribe audio data to text and to analyze or evaluate the transcribed text according to a confidence value, ranging from 0 to 1, whereby 0 represents an impaired or poor speech quality and 1 represents a good speech quality.

During the speech or talk of the currently speaking user 4 or participant, an audio data stream is continuously transmitted from the user's client 2 to the conference server 3 via a communication path 5, and from there to the other participants or users 4', 4", 4''' or their respective clients 2', 2", 2''' via their respective communication paths 5', 5", 5''' where the audio data stream is output via the respective devices, as mentioned above, via the headset 6, and via the loudspeakers 7, 7' so that the remotely located users 4', 4", 4''' are able to listen to the talk or speech of the speaking user 4 or participant.

The speech data generated at the client 2 and the speaking user 4 that is comprised in the audio data stream received at the respective clients 2', 2", 2''' via the respective communication paths 5', 5", 5''' is then transferred to the respective transcriber 8', 8", 8''' which may be, for example, a speech recognition engine for automatically recognizing speech and analyzing the latter as outlined above, and which is able to convert speech- or audio data into text (speech-to-text) without knowing any specific grammar. The transcribers 8', 8", 8''' respectively evaluate a confidence value as outlined above for the transcribed text generated from the received audio or speech data. The poorer the speech quality of the data, the lower the confidence value will be. Thus, the estimated confidence value may be used for determining the quality of the speech data comprised in the audio stream received at the clients 2', 2", 2''' from the client 2. Since the evaluation is based on the same data that the participants or users 4', 4", 4''' are currently listening to, the confidence value correlates to the audibility of the audio data stream for the listener or listeners quite well.

With respect to the transcription of the audio or speech data of the audio data stream generated at the speaker's client 2, the primary objective is the creation of a text representation of the respective audio data. However, the confidence value only is a secondary product of the transcription. Nevertheless, with respect to the method for determining the speech quality according to an embodiment of the present invention described here, the confidence value estimated by the transcriber can be used as a main goal, whereas the transcribed text itself may not be used.

Subsequently, the thus estimated confidence value can be transmitted back to the speaker 4 or to the speaker's client 2 automatically via the respective transmission paths 9', 9", 9''' from the clients 2', 2", 2''' to the central conference server 3, and from there, via the communication path 9 to the speaker's client 2, where the confidence value or values is/are displayed to the speaking user 4 at a display device 10 of the client 2 (e.g. a monitor or display). The user interface generated on the display device can be configured so that a mean value of all confidence values can be calculated and displayed for that particular user at the client 2, or all estimated confidence values for all the users or clients of a communication session can be displayed individually for each participant or client. The confidence values can be displayed as numbers, percentages, and/or in a chart format that may allow a user to see how the confidence value has changed over time from a prior time period up to the current time (e.g. from the start of a session to the current time, within the past 5 minutes of a session, etc.).

Each client 2 can be configured to provide such a display based on the spoken audio of that client 2 received from the client's user. As all values can be displayed individually for every client, the speaking user 4 at his or her client 2 may determine himself or herself at which client 2 a problem concerning the speech quality of this talk or speech may be present (for example, due to network problems on the communication path to a specific client), or in case a mean value is created, he or she may conclude that there is a general quality problem concerning the speech quality of his or her talk or speech, for example, caused by wrong or bad microphone positioning or settings.

It is noted that the processing of the various quality values represented by the confidence values may result automatically based on different strategies, as calculating the mean value, the worst value, etc., whereby only an overall result is transmitted and presented to the client 2 of the speaking user 4 via the display device 10. By this automated visual feedback of the speech or audio quality, the speaking user 4 can be able to take corresponding measures for resolving the problem, or he or she may at least be able to decide whether taking any counter-measures is necessary or not.

Moreover, the continuous determination of the speech quality can immediately uncover or allow quick detection of degradation or changes in the audio quality and can permit the creation of visual output via display device 10 of the client 2 for visualization of this change to the user who may be speaking in the communication session. The speaker, in case he or she has already recognized, due to bad quality values indicated by a low confidence value derived from the transcribed audio data stream, that a problem concerning the speech quality exists and has taken corresponding measures to alleviate or eliminate the source for bad audio quality, may then also determine whether his or her measures taken have been successful. Namely, if the quality value based on a mean confidence value of all confidence values increases, then the measure (for example, aligning the microphone or the like) has been successful.

Figure 2:
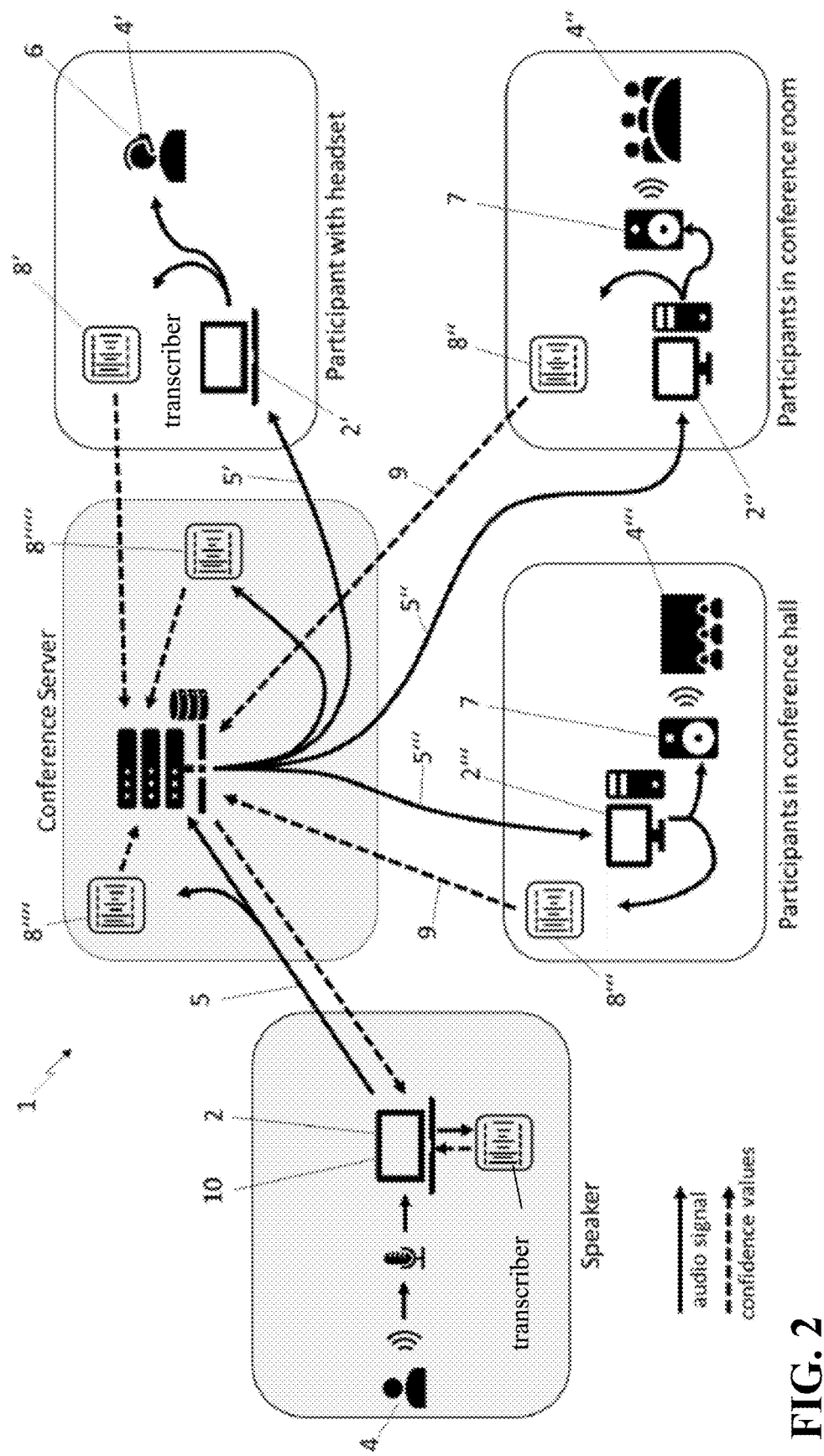
FIG. 2 schematically illustrates a communication system according to another embodiment of the invention.

FIG. 2 schematically illustrates a communication system 1 according to another embodiment of the invention. Here, the setup basically is the same as illustrated in FIG. 1, however, the difference to the configuration shown in FIG. 1 is that the conference server 3 is also equipped with multiple transcribers (e.g. transcribers 8"", 8""'). At least one of the server's transcribers can transcribe and evaluate the audio data stream received from the client 2 on the communication path 5 at its input, and the at least one other one of the transcribers can transcribe and evaluate the audio data stream at the output from the conference server 3, before being transmitted to the other clients 2', 2", 2"'.

Thus, the speech data may not only be tested at the various clients 2', 2", 2"' connected to the conference server 3 during the communication and collaboration session, but it can also be tested at different locations along the path from the speaking user's client 2 to the listening users' clients 2', 2", 2"'. Namely, as mentioned above, the conference server 3, which collects all speech data centrally and can mix that audio data for transmitting a mixed audio data stream for a session so that all the user's can hear each other's spoken communications captured by their respective clients 2 and then distributes the mixed audio data to the clients connected thereto. The server 3 can have at least two transcriber means 8"", 8""' for testing the audio signals as received from at least one client 2, and also as output from the server 3.

In some embodiments, the server 3 can have a series of first transcribers for transcribing audio received from each respective client and a second series of transcribers for evaluating the respective audio streams to be output by the server 3 for sending to the clients. By comparing the thus determined confidence values for the same audio data stream, thereby, in many cases, a qualified conclusion may be drawn for the cause of the possible bad or poor speech quality, as illustrated in the table below, which lists various analysis locations (i.e., testing locations for testing the audio signal by means of the transcriber means) and maps them to possible causes for degradation of the audio signal, if the confidence value lowers or is low.

| Analysis Location | Possible Cause (if confidence value decreases beyond a pre-selected threshold) |
| --- | --- |
| at the speaker's microphone | microphone position or setting, mumbling, background noise, dialect |
| at the input of the conference server | network path from speaking user to conference server |
| at the output of the conference server | problem with the conference server, e.g., audio mixing |
| at individual listening users and their respective clients | network path from conference server to listening users' clients |

The confidence values derived at various locations by analysis of the speech or audio quality based on transcribed audio data and estimation of the confidence value as outlined above may be used for improving the audio or speech quality. In case the cause of degraded audio or speech quality is determined to be at the speaking user's location, an immediate action may be taken and the speaking user may be notified that a problem exists concerning speech or audio quality.

Also, after a communication and collaboration session or audio/video conference, the confidence values which may have been recorded during the ongoing conference are very useful. For example, bottlenecks in certain network segments may be determined, or conclusions may be drawn on network problems that only occur at certain times or in certain time periods of the day. For example, if online conferences only take place at certain time of day, and problems with respect to the audio or speech quality occur in a certain network segments, the cause for such problems may be determined more easily (e.g. a particular bandwidth issue related to a particular segment of a network that could be due to malfunctioning equipment or other issue can be more easily detected).

It should be appreciated that different embodiments of the method, system, and apparatus can be developed to meet different sets of design criteria. For example, the particular type of network connection, server configuration or client configuration for use in embodiments of the method can be adapted to account for different sets of design criteria. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a network, a server, a telecommunications apparatus, a communication system, and methods of making and using the same have been shown and described above, it is to be distinctly understood that the invention is not limited thereto but may be otherwise variously embodied and practiced within the scope of the following claims.

What is claimed is:

1. A method of determining the speech quality in an Web-RTC audio and/or video communication session, comprising:

at least one first client of at least one first participant to the communication session receiving an audio data stream comprising speech data transmitted from a second client used by a second participant of the communication session, the at least one first client transcribing the speech data into text data to determine a confidence value for the transcribed text data, the confidence value indicating a probability on a correctness of word recognition from the speech data, and the at least one first client transmitting the determined confidence value to the second client so a display of the confidence value as a measure for speech quality is displayable by a display device of the second client during the communication session so a speech quality of the second participant during the communication session is identifiable to the second participant during the communication session via the display device of the second client;

wherein the at least one first client is a plurality of first clients and the confidence value is determined at all of the first clients based on transcription of the speech data obtained from the audio stream transmitted from the second client; and calculating a mean value for all confidence values determined at all the first clients, and transmitting the mean value to the second client for generation of the display of the confidence value as a measure for speech quality.

2. The method of claim 1, also comprising:
displaying output based on the determined confidence value transmitted by the at least one first client via a display device of the second client during the communication session.

3. The method of claim 2, wherein the transcribing of the speech data into text data is performed by a transcriber that comprises a voice recognition engine.

4. The method of claim 2, wherein the confidence value is visually displayed at the display device.

5. The method of claim 1, wherein the confidence value is a value in a range of 0 to 1 or 0% to 100%.

6. The method of claim 1, wherein the second participant is a speaker in the communication session and the at least one first participant is a listener in the communication session.

7. The method of claim 1, wherein the determination of the confidence value for the transcribed text data is carried out continuously during the communication session.

8. The method of claim 1, wherein the communication session is an audio conference or a video conference.

9. The method of claim 1, comprising:
testing the audio stream comprising the speech data at at least one location along a transmission path between the second client and the at least one first client.

10. The method of claim 9, wherein the at least one further location on the transmission path includes at a conference server.

11. The method of claim 10, wherein the audio stream comprising the speech data is tested when entering the conference server, and also when leaving the conference server for transmission to the at least one first client.

12. The method of claim 10, wherein the conference server has at least one transcriber, the conference server testing the audio stream comprising the speech data by transcribing the speech data into text data to determine a confidence value for the transcribed text data, the confidence value indicating the probability on the correctness of word recognition from the speech data.

13. The method of claim 1, comprising:
receiving, by a server, the audio data stream comprising speech data transmitted from the second client during the communication session;
transcribing, by the server, the speech data into text data to determine a confidence value for the transcribed text data that indicates a probability on the correctness of word recognition from the speech data, and
transmitting, by the server, the determined confidence value to the second client so the display of the confidence value as the measure for speech quality that is displayable by the display device of the second client during the communication session also includes the determined confidence value transmitted by the server.

14. A method of determining the speech quality in an Web-RTC audio and/or video communication session, comprising:
at least one first client of at least one first participant to the communication session receiving an audio data stream comprising speech data transmitted from a second client used by a second participant of the communication session,
the at least one first client transcribing the speech data into text data to determine a confidence value for the transcribed text data, the confidence value indicating a probability on a correctness of word recognition from the speech data, and
the at least one first client transmitting the determined confidence value to the second client so a display of the confidence value as a measure for speech quality is displayable by a display device of the second client during the communication session so a speech quality of the second participant during the communication session is identifiable to the second participant during the communication session via the display device of the second client;
wherein the at least one first client is a plurality of first clients and the confidence value is determined at all of the first clients based on transcription of the speech data obtained from the audio stream transmitted from the second client; and
wherein all confidence values determined at all of the first clients are transmitted to the second client and the display of the confidence value as a measure for speech quality includes all of the confidence values.

15. A communication system for performing a WebRTC-based audio or video communication session, comprising:
a conference server that is communicatively connectable to a plurality of clients via a communication network, the clients comprising at least one first client and a second client;
each of the first clients connectable to the second client via the conference server to:
receive an audio data stream comprising speech data transmitted from the second client used by a second participant of the communication session,
transcribe the speech data into text data to determine a confidence value for the transcribed text data, the confidence value indicating a probability on a correctness of word recognition from the speech data, and
transmit the determined confidence value to the second client so a display of output that is based on the confidence value as a measure for speech quality is displayable by a display device of the second client during the communication session so a speech quality of the second participant during the communication session is identifiable to the second participant during the communication session via the display device of the second client;
wherein the at least one first client is a plurality of first clients and the confidence value is determined at all of the first clients based on transcription of the speech data obtained from the audio data stream transmitted from the second client; and
one of:
wherein all confidence values determined at all of the first clients are transmittable to the second client and the display of the output that is based on the confidence value as a measure for speech quality includes all of the confidence values, or
the server is configured to calculate a mean value for all confidence values determined at all the first clients and transmit the mean value to the second client for generation of the display of the output that is based on the confidence value as a measure for speech quality.

16. The communication system of claim 15, wherein the server comprises at least one transcriber, the server configured to:

receive the audio data stream comprising speech data transmitted from the second client during the communication session, transcribe the speech data into text data to determine the confidence value for the transcribed text data, the confidence value indicating a probability on the correctness of word recognition from the speech data, and transmit the determined confidence value to the second client so the display of the output is also based on the confidence value determined by the server.

\* \* \* \* \*